US009792723B2

United States Patent
Lee et al.

(10) Patent No.: US 9,792,723 B2
(45) Date of Patent: Oct. 17, 2017

(54) METHOD AND SYSTEM FOR PROGRESSIVELY SCULPTING THREE-DIMENSIONAL GEOMETRY

(71) Applicant: Disney Enterprises, Inc., Burbank, CA (US)

(72) Inventors: Gene S. Lee, Burbank, CA (US); Brian Whited, Glendale, CA (US); David Suroviec, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 206 days.

(21) Appl. No.: 14/680,903

(22) Filed: Apr. 7, 2015

(65) Prior Publication Data
US 2016/0300377 A1    Oct. 13, 2016

(51) Int. Cl.
G06T 13/20 (2011.01)
G06T 15/50 (2011.01)

(52) U.S. Cl.
CPC ............ *G06T 15/50* (2013.01); *G06T 13/20* (2013.01)

(58) Field of Classification Search
None
See application file for complete search history.

(56) References Cited

U.S. PATENT DOCUMENTS

| 5,680,531 | A | * | 10/1997 | Litwinowicz | G06T 13/80 345/473 |
| 5,692,117 | A | * | 11/1997 | Berend | G06T 13/80 345/475 |
| 6,437,784 | B1 | * | 8/2002 | Bentley | G06T 13/20 345/473 |
| 7,042,457 | B2 | * | 5/2006 | Rosel | G06T 11/203 345/442 |

(Continued)

OTHER PUBLICATIONS

Lewis, John P., Matt Cordner, and Nickson Fong. "Pose space deformation: a unified approach to shape interpolation and skeleton-driven deformation." Proceedings of the 27th annual conference on Computer graphics and interactive techniques. ACM Press/Addison-Wesley Publishing Co., 2000.*

(Continued)

*Primary Examiner* — Yu Chen
(74) *Attorney, Agent, or Firm* — Patterson + Sheridan, LLP

(57) ABSTRACT

The disclosure provides an approach for progressively sculpting three-dimensional (3D) geometry. In one configuration, a sculpting application receives time-based sculpts and stores the sculpted changes from the original geometry, referred to herein as "offsets," in "fixes" which include (time, offsets) pairs, with the offsets being defined in relation to a reference frame. Each fix may further be associated with a "set" which includes portions of the geometry that are managed together. The sculpting application automatically provides smooth transitions between sculpts by applying (Continued)

scatter-data interpolation to interpolate the offsets of successive fixes, thereby generating new offsets for frames in between user-provided fixes. Further, the user may modify an envelope curve for a set to scale offsets, including offsets in fixes and those automatically generated through interpolation. In addition, tools are disclosed herein that permit a user to manipulate offsets, as opposed to manipulating the geometry itself.

18 Claims, 7 Drawing Sheets

(56) References Cited

U.S. PATENT DOCUMENTS

| | | | | |
|---|---|---|---|---|
| 8,207,971 | B1* | 6/2012 | Koperwas | G06T 13/40 345/473 |
| 8,970,628 | B1* | 3/2015 | Jensen | G06T 19/20 345/419 |
| 2007/0176923 | A1* | 8/2007 | Lee | B66D 3/006 345/420 |

OTHER PUBLICATIONS

Wesson, Bradley, and Brett Wilkinson. "Evaluating organic 3D sculpting using natural user interfaces with the Kinect." Proceedings of the 25th Australian Computer-Human Interaction Conference: Augmentation, Application, Innovation, Collaboration. ACM, 2013.*

Perry, Ronald N., and Sarah F. Frisken. "Kizamu: A system for sculpting digital characters." Proceedings of the 28th annual conference on Computer graphics and interactive techniques. ACM, 2001.*

Turk, Greg, and James F. O'brien. "Modelling with implicit surfaces that interpolate." ACM Transactions on Graphics (TOG) 21.4 (2002): 855-873.*

Goldberg, A., and Robson, D. 1983. "Smalltalk-80: The Language and Its Implementation". Addison-Wesley Longman Publishing Co., Inc., Boston, MA, USA, 742 pages.

Lee, G.S., and Hanner, F. 2009. "Practical Experiences with Pose Space Deformation". In SIGGRAPH Asia 2009 Sketches, ACM, New York, NY, USA, 1 page.

* cited by examiner

METHOD AND SYSTEM FOR PROGRESSIVELY SCULPTING THREE-DIMENSIONAL GEOMETRY

BACKGROUND

Field

This disclosure provides techniques for manipulating three-dimensional virtual geometry. More specifically, aspects of this disclosure present techniques for progressively sculpting three-dimensional virtual geometry.

Description of the Related Art

Deformation of geometry is a critical element of three-dimensional (3D) animation production pipelines. Shapes produced algorithmically by computer animation tools, such as character rigs and simulations, are typically unable to account for all conceivable shape changes. As a result, shapes often need to be corrected by hand to meet desired artistic goals. In some cases, manual manipulation of geometry can be a practical means of animating or post-processing shapes. However, such manual manipulation can also be tedious. There is a need for an efficient tool to generate desired geometry in 3D animations.

SUMMARY

One aspect of this disclosure provides a computer implemented method for progressively sculpting three-dimensional (3D) virtual geometry in an animation with a plurality of frames. The method generally includes receiving one or more sets defined by a user, wherein each set specifies portions of the 3D virtual geometry managed together. The method further includes receiving digital sculpting of the 3D virtual geometry and storing the sculpted 3D virtual geometry as fixes, where each fix includes a respective time and one or more offsets specifying differences between the 3D virtual geometry before and after the sculpting at the respective time, and where each fix is associated with one of the sets defined by the user. In addition, the method includes rendering the animation based on the fixes and interpolations between the fixes.

Other aspects include, without limitation, a computer-readable medium that includes instructions that enable a processing unit to implement one or more aspects of the disclosed method as well as a system configured to implement one or more aspects of the disclosed method.

BRIEF DESCRIPTION OF THE DRAWINGS

So that the manner in which the above recited features of the present disclosure can be understood in detail, a more particular description of the disclosure, briefly summarized above, may be had by reference to various aspects, some of which are illustrated in the appended drawings. It is to be noted, however, that the appended drawings illustrate only exemplary configurations and are therefore not to be considered limiting of its scope, may admit to other equally effective configurations.

Figure 1:
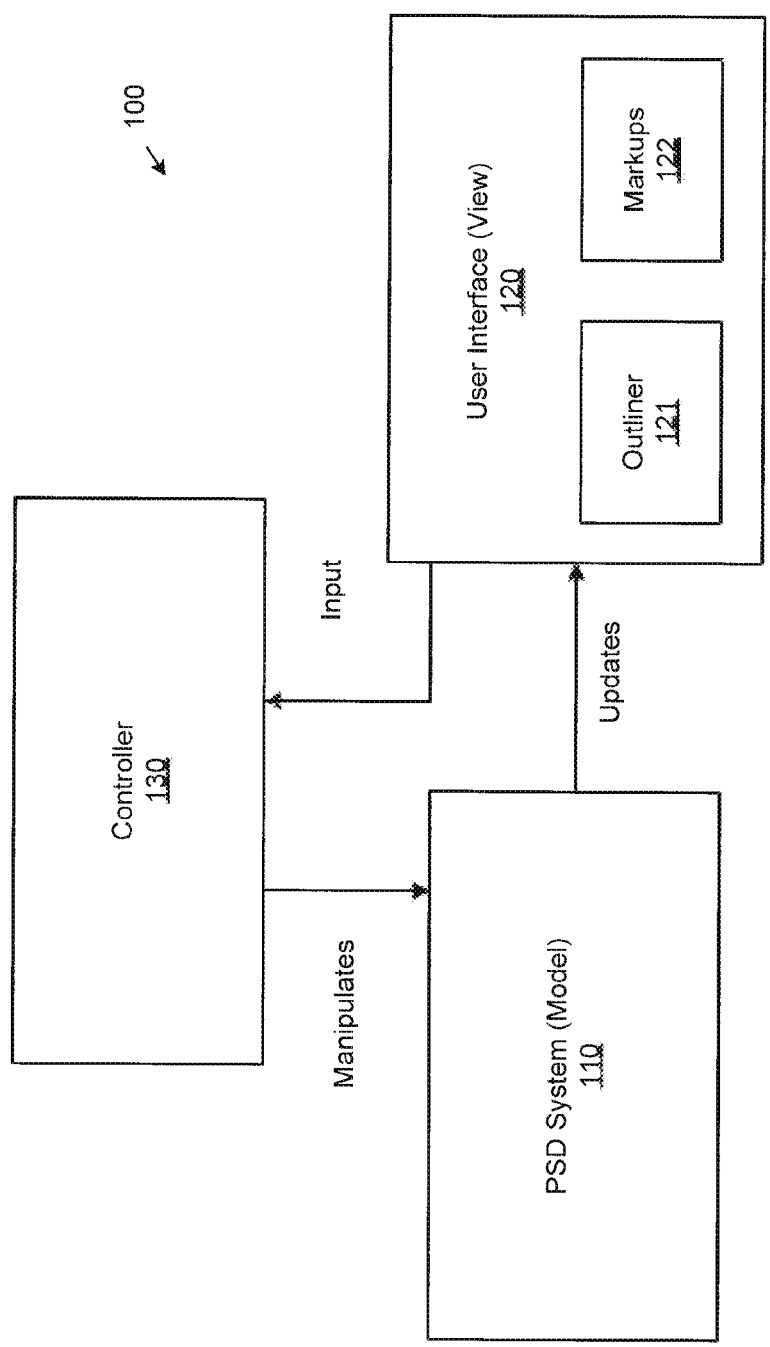
FIG. 1 illustrates an approach for sculpting and managing time-based shape changes, according to an aspect of this disclosure.

To facilitate understanding, identical reference numerals have been used, where possible, to designate identical elements that are common to the figures. It is contemplated that elements and features of one configuration may be beneficially incorporated in other configurations without further recitation.

DETAILED DESCRIPTION

This disclosure presents techniques for progressively sculpting three-dimensional (3D) geometry in an animation. As used herein, "sculpting" refers to digitally modifying 3D geometry, such as by pushing, pulling, smoothing, grabbing, or pinching the original geometry, also referred to herein as the "base mesh." Although discussed with respect to 3D geometry, techniques disclosed herein are also applicable to rigs which include the geometry as well as controls and bones used to animate the mesh. In one configuration, a sculpting application receives time-based sculpts (i.e., sculpts associated with particular frames in an animation) and stores the sculpted changes from the base mesh, referred to herein as "offsets," in "fixes" which include (time, offsets) pairs, with the offsets being defined in relation to a reference frame. Each fix may further be associated with a "set" which includes shapes in the geometry that are managed together (e.g., the clothing of a character may be managed using one set). The sculpting application automatically provides smooth transitions between sculpts by applying scatter-data interpolation to interpolate the offsets of successive fixes, thereby generating new offsets for frames in between user-provided fixes. Further, the user may modify an envelope curve for a set to scale offsets, including offsets in fixes and those automatically generated through interpolation, and thereby adjust the magnitude and timing of changes. In addition, tools are disclosed herein that permit a user to manipulate offsets, as opposed to manipulating the geometry itself.

FIG. 1 illustrates an approach for sculpting and managing time-based shape changes, according to an aspect of this disclosure. As shown, a sculpting application relies on a model-view-controller architecture 100. Although the model-view-controller architecture 100 is one convenient implementation, other configurations may be implemented without using the model-view-controller architecture. In the model-view-controller architecture 100, the model 110, which manages the data, logic, and rules of the sculpting application, may be a pose space deformation system (PSD) or another type of scattered-data interpolation system. The scattered-data interpolation system is configured to receive sculpting of 3D geometry and store the sculpted geometry as fixes, which are (time, offsets) pairs, with the offsets being differences between the sculpted and the original geometry defined in relation to a reference frame, which defines a coordinate system for establishing position and orientation. The reference frame may be defined in any feasible manner, such as with a normal to the geometry's surface as the z axis, and one edge coming out of the normal as the x axis and an orthogonal axis as the y axis.

In one configuration, each offset may represent the difference between one vertex in the sculpted geometry and the original 3D geometry, although in alternative configurations each offset may not correspond to a single vertex. It will be understood that 3D geometry typically includes many vertices. After 3D geometry is sculpted using digital sculpting tools to a desired shape, the user may "commit" the sculpt to save it. In response to such a commit, the sculpting application may compute offsets as the differences (either as a scalar or a vector) between vertices of the sculpted and the original 3D geometry and store fixes, which associate the offsets with the time as (time, offsets) pairs. Fixes are conceptually similar to keyframes, except fixes store offsets.

To render the animation, the sculpting application takes geometry as input, computes offsets at times between the stored fixes using scatter data interpolation, applies the offsets from the fixes to input geometry at corresponding frames and the interpolated offsets to the input geometry at other corresponding frames to obtain new geometry, and draws the new geometry in the frames. Scatter data interpolation is a form of interpolation which permits data points (e.g., offsets) anywhere in time to be interpolated, as opposed to some interpolation techniques which require data points to be evenly spaced on, e.g., specific grid locations.

In one configuration, geometry may be fed through a pipeline which includes a number of deformation nodes, one of which computes and/or applies the offsets to produce new geometry, and other nodes may include a node that shrinks the geometry or an "exploder" node that fragments the geometry. In such a case, sculpts may be organized hierarchically and stored in a single data node. Unlike traditional tools based on, e.g., blendshapes or custom deformers, this approach adds only a single deformer to a shape's deformation chain. Traditional tools may continually push sculpts to the end of the deformation chain, and such a deformation chain may look like, e.g., geometry-deformer-sculpt-sculpt-sculpt-output. In contrast, one configuration may store sculpts in a single node, located anywhere in the deformation chain. Such a deformation chain may look like, e.g., geometry-sculpts-deformer-output, and the downstream deformer may be automatically inverted during sculpting. As a result, users need not analyze or re-order a stack of deformations to create or edit time-based sculpts.

In another configuration, the offsets themselves may be first-class objects, i.e., objects that are manipulatable (e.g., can be blended or changed). In particular, the offsets may be capable of being edited, queried, and passed around. For example, the sculpting application may permit offsets to be taken from one shape and applied to another shape and to blend offsets to create new offsets.

The view layer 120 of the model-view-controller architecture 100 is a user interface which includes an outliner 121 and markups 122 to an animation timeline editor. As discussed in greater detail below with respect to FIG. 2, the outliner 121 is an interface that may be used to organize sculpts into sets. Each set associates a collection of shapes with various properties, including an envelope curve, discussed in greater detail below. The collection of shapes may include geometry selected by a user, and such geometry is managed together so that when the set is sculpted, the resulting offset is only applied to geometry in that set. For example, the user may specify one set which includes geometry for clothing of a character and a second set which includes geometry for the same character's body. These sets may then be sculpted and managed separately. It should be understood, however, that sets need not be mutually exclusive, i.e., the same geometry may be included in multiple sets.

In one configuration, multiple fixes may be sculpted for each set, at different times. The sculpting application, which may be a PSD interpolation system, automatically creates the in-betweens by interpolating between successive fixes, and, for any given frame, fixes associated with different sets may be accumulated to generate a final deformed geometry. For example, assume a user creates fixes F1, F2, and F3 for set A and fixes F4, F5, and F6 for set B. In such a case, sculpting application may interpolate between F1, F2, and F3 to generate in-between offsets and separately interpolate between F4, F5, and F6 to generate offsets in between those fixes. If set A and set B share common geometry (e.g., if set A and set B both include a character's clothing and the associated fixes fix such clothing), then the offsets are summed to produce the deformation to geometry that is actually applied. That is, interpolation is performed on a set-by-set basis, and the results are summed at the end.

In another configuration, the sculpting application may permit two or more sets to be merged into a single set, and conversely, a single set to be split into distinct sets. When sets are merged, geometry belonging to those individual sets are included in the merged set. When a set is split, the geometry belonging to the set is divided into separate geometry that is included in each of the resulting sets. Reasons to split a set may include to permit the timing of fixes for different geometries to be adjusted independently, or to permit each of the split geometries to be edited separately from the other geometry. For example, if an animator places a body and a cape of a character in a set to sculpt them together, the animator may later split the body and cape into different sets to separately fine tune the sculpts to the body and the cape and control the timing of when the sculpts take effect.

Figure 4:
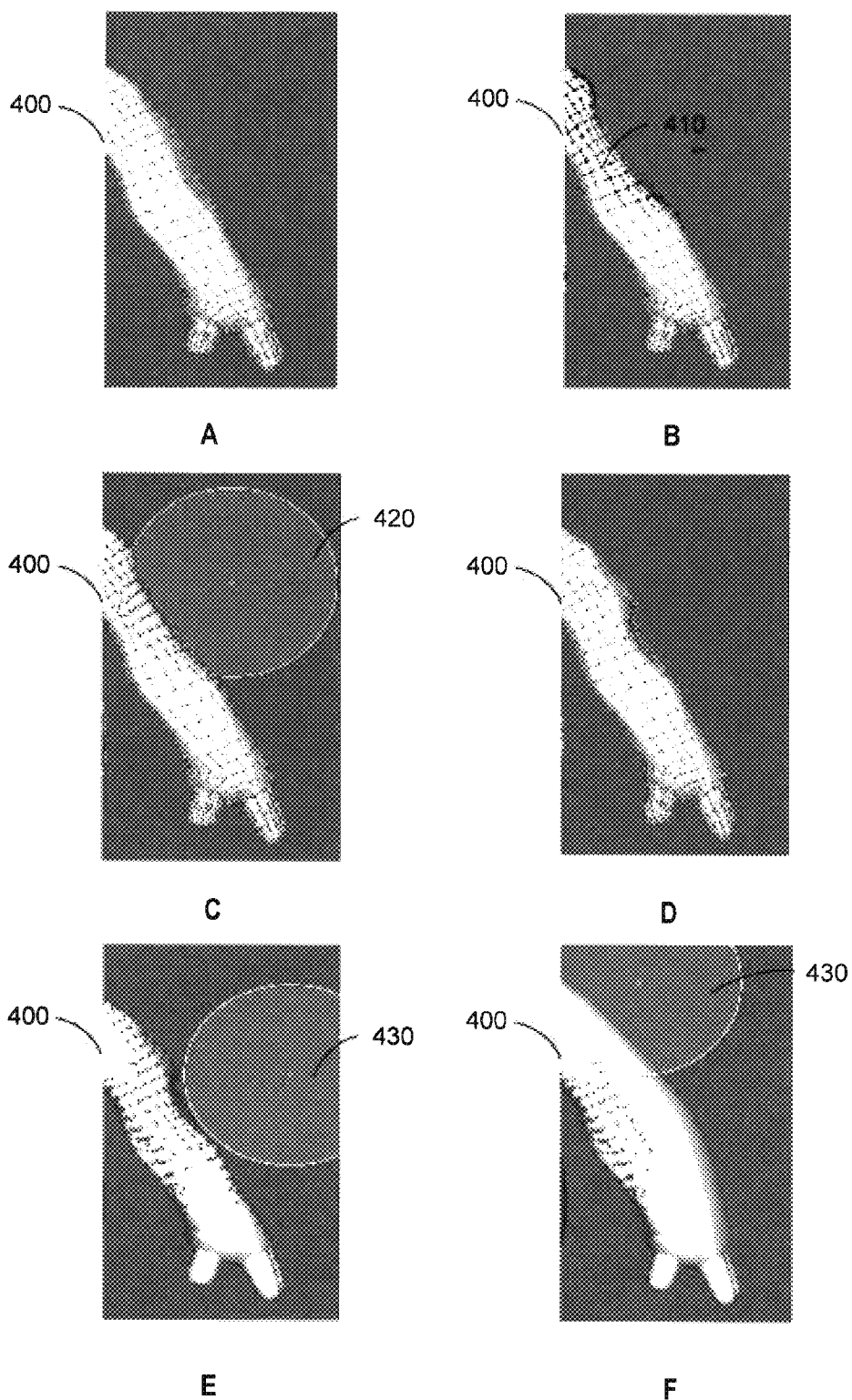
FIG. 4 illustrates example applications of the reset and zero brushes, according to an aspect of this disclosure.

The markups in the view layer 120 UI identify times and types of fixes and further enable users to selectively modify the fixes. As discussed, fixes may be in the form of (time, offsets) pairs, and the sculpting application automatically generates the offsets in frames between fixes by interpolating between offsets of the fixes. That is, a user may sculpt geometry in one frame and a later frame, with the sculpted changes being stored as offsets in fixes, and the sculpting application may handle transitions between the fixes through interpolation. If the user dislikes the automatically generated transition, then the user may manually add one or more additional fixes (e.g., by copying and pasting an existing fix) between the two fixes being interpolated or, alternatively, adjust scaling of the interpolation using an envelope curve. An example of fixes on a timeline and an envelope curve associated therewith is shown in FIG. 4, discussed in greater detail below.

In general, the envelope curve may be modifiable at any time between the neighboring fixes, as well as at the times of the fixes themselves. In one configuration, there may be one envelope curve for a set of sculpts. Modifying an envelope curve changes scaling of offsets for the set of sculpts. For example, if the envelope curve may have a default value of "1" everywhere, meaning the offsets are scaled by 1 and unchanged. A user may modify portions of the envelope curve to be different from 1 by, e.g., creating a keyframe, and the different envelope curve value may increase or decrease the value of the offsets, i.e., scale the offsets. For example, modifying the envelope curve to 2 at one keyframe may make the offset at that frame, which may be in a fix or automatically generated through interpolation, twice as big. As another example, making the envelope curve into a wiggly sine-like curve may cause interpolated offsets to wiggle too, becoming larger and smaller over time. Modifying the envelope curve thus permits adjusts to the magnitude and timing of shape changes.

One configuration may also permit users to combine previously sculpted offsets to create new offsets. For example, the user may specify that 50% of an offset in fix X and 50% of an offset in fix Y be combined to generate a new offset for a frame between fixes X and Y.

The controller layer 130 includes middleware configured to manage the interplay between the UI and the PSD system. For example, the controller may accept inputs (e.g., for sculpting 3D virtual geometry, etc.) that the user makes via the view layer 120 UI and convert the inputs to commands to the PSD system.

Figure 2:
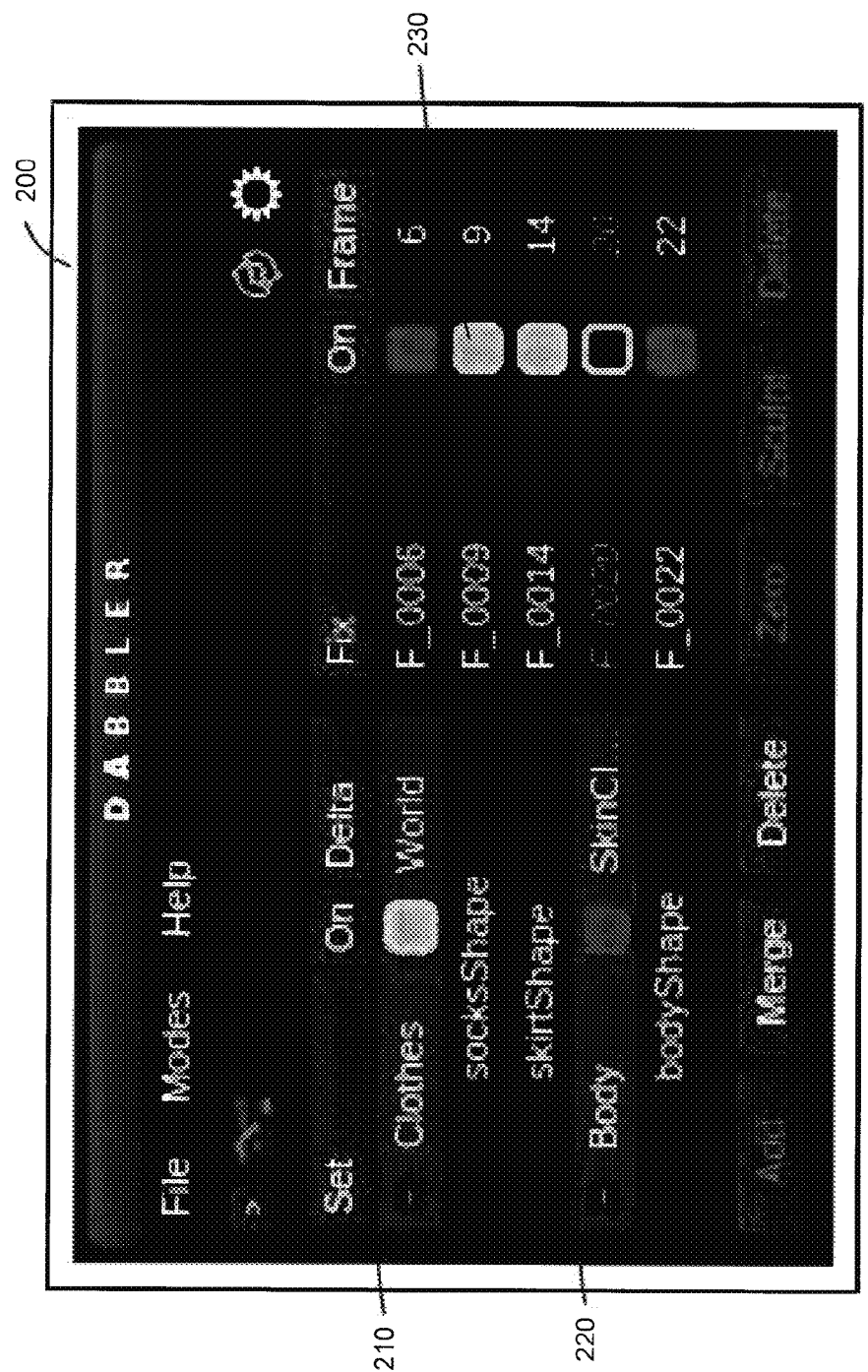
FIG. 2 illustrates an example of an outliner user interface, according to an aspect of this disclosure.

FIG. 2 illustrates an example of an outliner 200 user interface, according to an aspect of this disclosure. As discussed, the outliner 200 is a part of the view layer 120 UI that a user interacts with to create sets and define properties of the sets. Illustratively, sets 210-220 corresponding to the "Clothes" and "Body" of a 3D character that have been defined. To create such sets, the user may select a number of shapes in a geometry to include in the set and name the sets "Clothes," "Body," or any other desired name. Once defined, the geometry within the set are managed holistically. For example, geometry in the "Body" set of the character may be sculpted and managed together. As another example, if body and clothing of a character are in different sets, their respective geometries may be sculpted and processed (e.g., interpolated) separately. Illustratively, the fixes 230 are associated with particular sets 210-220, and these associations are also indicated by color in the outliner 200. In this particular example, fixes for both sets 210-220 are shown on the right-hand-side of the outliner 200 because both sets 210-220 are highlighted. If only one of the sets 210-220 were selected, then the outliner 200 may show only fixes corresponding to the selected set.

The properties of a set may include the geometries included in the set, an envelope curve, a state (for enabling/disabling the set), and a reference space (also referred to as a "delta space"), among other things. Such properties may also be defined via the outliner 200. In addition, set membership itself may be altered by splitting and/or merging sets using the outliner 200 UI. For example, body and clothing of a character may initially belong to different sets, but a user may ultimately merge these sets into a single set so that the body and clothing can be sculpted and processed together. The resultant set contains the union of the fixes from the original sets.

Figure 3:
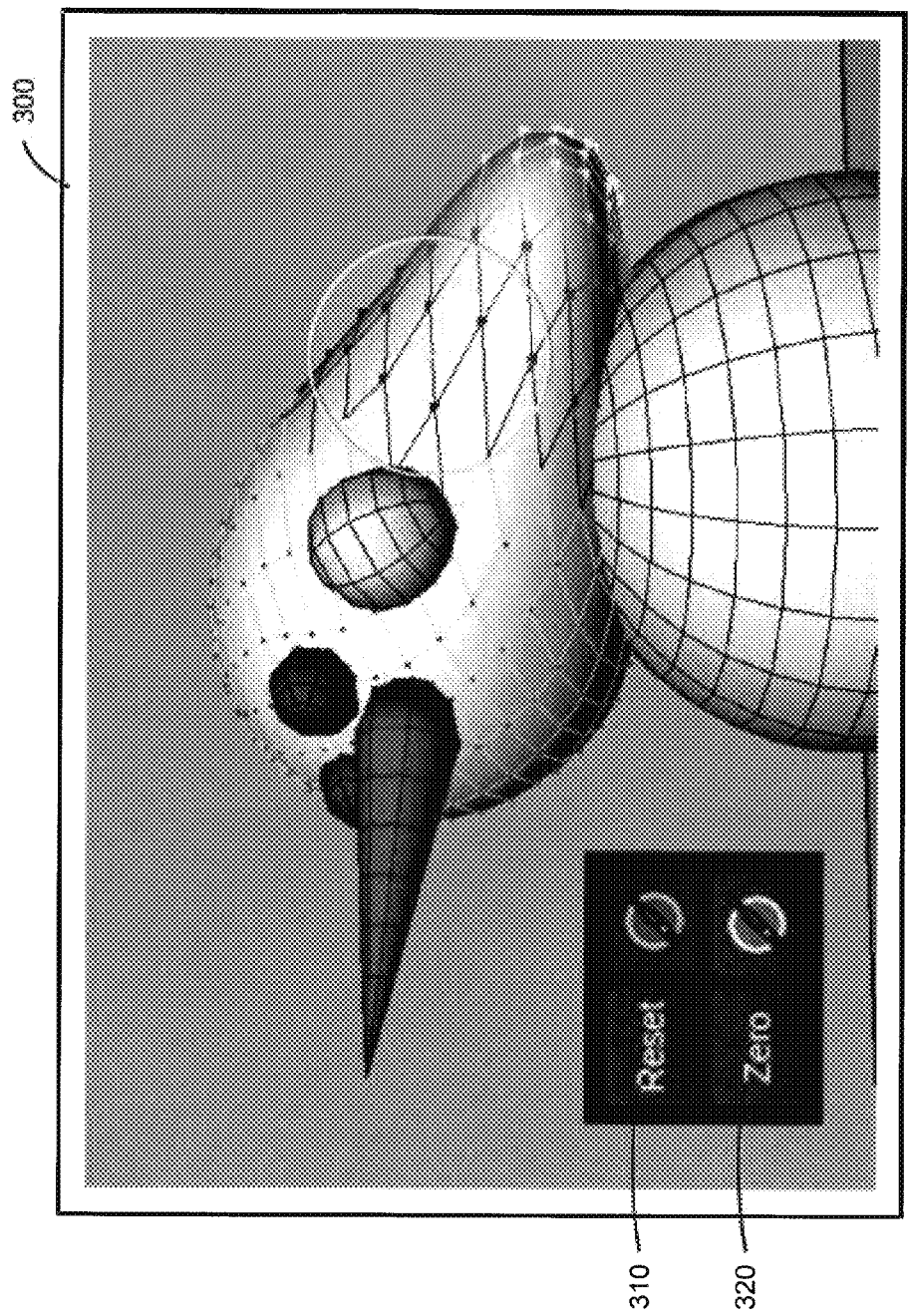
FIG. 3 illustrates an example of a user interface for sculpting fixes, according to an aspect of this disclosure.

FIG. 3 illustrates an example of a user interface 300 for sculpting fixes, according to an aspect of this disclosure. As discussed, offsets that define differences between the original 3D geometry and user-sculpted geometry are one approach for implementing fixes. A user may add fixes to the animation by progressively updating time in the animation, sculpting the 3D geometry in frames of the animation, and committing the sculpts, after which the sculpting application computes the difference between the sculpted and original geometry and stores the difference as fixes in the form of (time, offsets) pairs. Sculpting itself may be performed with various digital sculpting tools, and the sculpting application may automatically store the sculpts as fixes with time updates, or in response to explicit commits by the user.

In one configuration, the sculpting application may provide, in addition to other digital sculpting tools, an offset slider and two offset brushes: reset 310 and zero 320. The offset slider and offset brushes manipulate offsets, as opposed to the geometry itself. The offset slider is configured to gradually blend a current sculpt with offsets of the fix that are chronologically next or prior. For example, sculpts at animation frames 5 and 15 may be blended using the offset slider to automatically generate a new sculpt for frame 10 that is X percent of the prior fix and Y percent of the next fix, and this new sculpt may then be committed by the user and stored as a fix. Moving the slider to the left or right (or top to bottom in an alternative configuration) may change the degree to which offsets from the prior fix and the next fix are borrowed for the new sculpt. It should be understood that, in other configurations, the offset slider may blend offsets from only a prior fix or a later fix, but not both, and in general many kinds of sliders may be used. The offset slider permits users to quickly apply similar changes to multiple fixes and to quickly adjust the ins and outs of transitions. Note that the offset slider, as well as the offset brushes, may be used to manipulate the offsets in fixes and/or the offsets between fixes generated through interpolation.

The reset brush 310 is configured to progressively reduce the magnitude of changes introduced by the sculpting process. By repeatedly applying the reset brush 320, the sculpting application may eventually remove all changes such that the geometry retains its pre-sculpt state. As used herein, "pre-sculpt" state refers to the base mesh plus any interpolated offsets. Normally, when a user sculpts the mesh, a copy is made that looks like the base mesh plus interpolated offsets for the time at which the sculpt was made. Over time, the user may sculpt this copy, and the sculpt will look like the base mesh, plus interpolated offsets, plus sculpted changes. The reset brush 310 is configured to remove sculpted changes only, while the zero brush 320, discussed in greater detail below, will remove the interpolated offset and sculpted changes. For example, if a user has sculpted a series of offsets, which as discussed are differences between the original geometry and the sculpted geometry, but the sculpting goes too far in certain areas, the reset brush 310 allows the user to reduce the impact that an offset has in certain spots so that the geometry appears more like the pre-sculpt state. The reset brush 310 thus acts on user-selected vertices to scale offsets, in a similar manner as the envelope curve may be used to scale offsets for entire sets. The reset brush 310 enables users to quickly undo changes to localized areas and to make selective refinements to sculpts.

The zero brush 320 is similar to the reset brush, except that it removes interpolated offsets as well. As discussed, interpolated offsets are offsets generated through interpolation of sculpted fixes. In particular, the zero brush may remove changes back to the original 3D geometry (i.e., the base mesh), rather than going back to the previous mesh before the current offset is applied. That is, fully applied, the zero brush 320 will make sculpt look like the base mesh. This enables users to quickly dial down offsets and to localize interpolation to desired frames.

It should be understood that other types of offset brushes may be used in addition to those discussed herein. For instance, another brush may smoothly ripple offsets along the surface of the geometry.

FIG. 4 illustrates example applications of the reset and zero brushes, according to an aspect of this disclosure. Panel A depicts a 3D virtual geometry arm 400 which has been sculpted. As shown in panel B, geometry of the arm 400 is modified through further sculpting of a portion 410 of the arm 400. Such sculpting may generally be achieved by pushing, pulling, smoothing, grabbing, or pinching the original geometry, among other things, using various sculpting tools.

Panel C shows application of a reset brush 420. As discussed, the reset brush 420 is configured to modify offsets to progressively reduce the magnitude of changes introduced by the sculpting process, and, by repeatedly applying the reset brush 420, the sculpting application may eventually remove all changes such that the geometry retains its pre-sculpt state. Illustratively, the magnitude of the deformation to the arm 400 introduced through the further sculpting, depicted in panel B, is reduced by application of the reset brush 420. That is, application of the reset brush 420 causes vertices to move back towards their positions in the previous mesh. Panel D shows the resulting 3D virtual geometry after the reset brush 420 is employed.

Panel E shows application of a zero brush 430. As discussed, the zero brush 420 progressively reduces the magnitude of changes introduced through sculpting like the reset brush 420, but the zero brush 430 removes interpolated offsets as well that are generated through interpolation of sculpted fixes. Further, the zero brush 430 may remove changes back to the original arm geometry, rather than going back to the previous mesh before the current offset is applied. Panel F shows the resulting 3D virtual geometry after the zero brush 430 is employed, with vertices moved back towards their positions in an original geometry in which the arm 400 is smooth.

Figure 5:
FIG. 5 illustrates a user interface for managing transitions between sculpts, according to an aspect of this disclosure.

FIG. 5 illustrates a user interface 500 for managing transitions between sculpts, according to an aspect of this disclosure. As shown, the user interface 500 depicts a timeline and the fixes $510_i$, on the timeline. Illustratively, the fixes $510_i$, are associated with their respective sets (e.g., the "Clothes" and "Body" sets). That is, every fix appears in the timeline, and fixes of the same set are indicated with, e.g., the same color, while fixes of different types may have, e.g., different icons.

The user interface 500 permits users to apply keyframe operations such as copy, paste, and scale, from the timeline to control the timing and interpolation of fixes. For example, using cut and paste, a user may update the time of a fix to a time when the shape of the base mesh is different than its shape at the time the fix was originally created. The sculpting application may automatically move and/or rotate the fix in the new frame to correspond to the shape of the 3D geometry in that frame. The result may depend on the coordinate frame defined on the set. In particular, an offset is dependent upon its reference frame, which may be, e.g., a coordinate frame based on the normal of the surface upon where the offset is placed. When moved to a different time, the normal of the surface may change. Simply applying the existing offset to the new reference frame may not work, as the sculpt may look different (e.g., a sculpted bump to a character's hand may change position or orientation). To overcome this problem, the sculpting application may derive a new offset. This may be computed directly, or by placing the original offset on the base mesh itself and then computing a new offset in relation to the current reference frame.

Precise interpolation and scaling may be achieved by modifying an envelope curve 520. As discussed, the envelope curve 520 is adjustable to define scaling of offsets, thereby increasing and/or decreasing the values of offsets that are applied at frames associated with fixes and in-between frames where offsets are generated by interpolation. As a result, the envelope curve 520 influences the timing of the sculpts as they come in and out. For example, the envelope curve 520 may have a default value of "1" everywhere. The default value of "1" may have no effect on the interpolation, as the resultant offsets are scaled by 1 and unchanged, while modifying the envelope curve to be different from 1 may increase or decrease the value of the offsets, i.e., scale the offsets. Thus, rather than manually sculpting a shape again to scale the shape, a user may simply adjust the envelope curve to scale a previously sculpted offset to be larger or smaller. Note, a user may add keys to the envelope curve 520 to adjust the curve itself, and such keys do not have to correspond to any fix. Illustratively, there are fixes $510_i$ at times 9, 14, and 20, while there are additional keyframes at times 12 and 17 to adjust the interpolation. The keyframes at times 9, 14, and 20 correspond to envelope curve values that scale the offsets of fixes $510_i$, whereas the keyframes at times 12 and 17 correspond to envelope curve values that scale interpolated offsets at those times. The sculpting application may automatically handle the transitions between the envelope curve keyframes. For example, if in a first keyframe the envelope curve is adjusted to have a value of 2 (corresponding to doubling offsets at that keyframe) and the envelope curve is left at the default value of 1 at a second keyframe, then the sculpting application may automatically generate an envelope curve value of 1.5 halfway between the first and second keyframes use a similar approach to generate values for other frames between the first and second keyframes. As a result, the scaling does not suddenly drop from 2 to 1 in a step-wise fashion.

Figure 6:
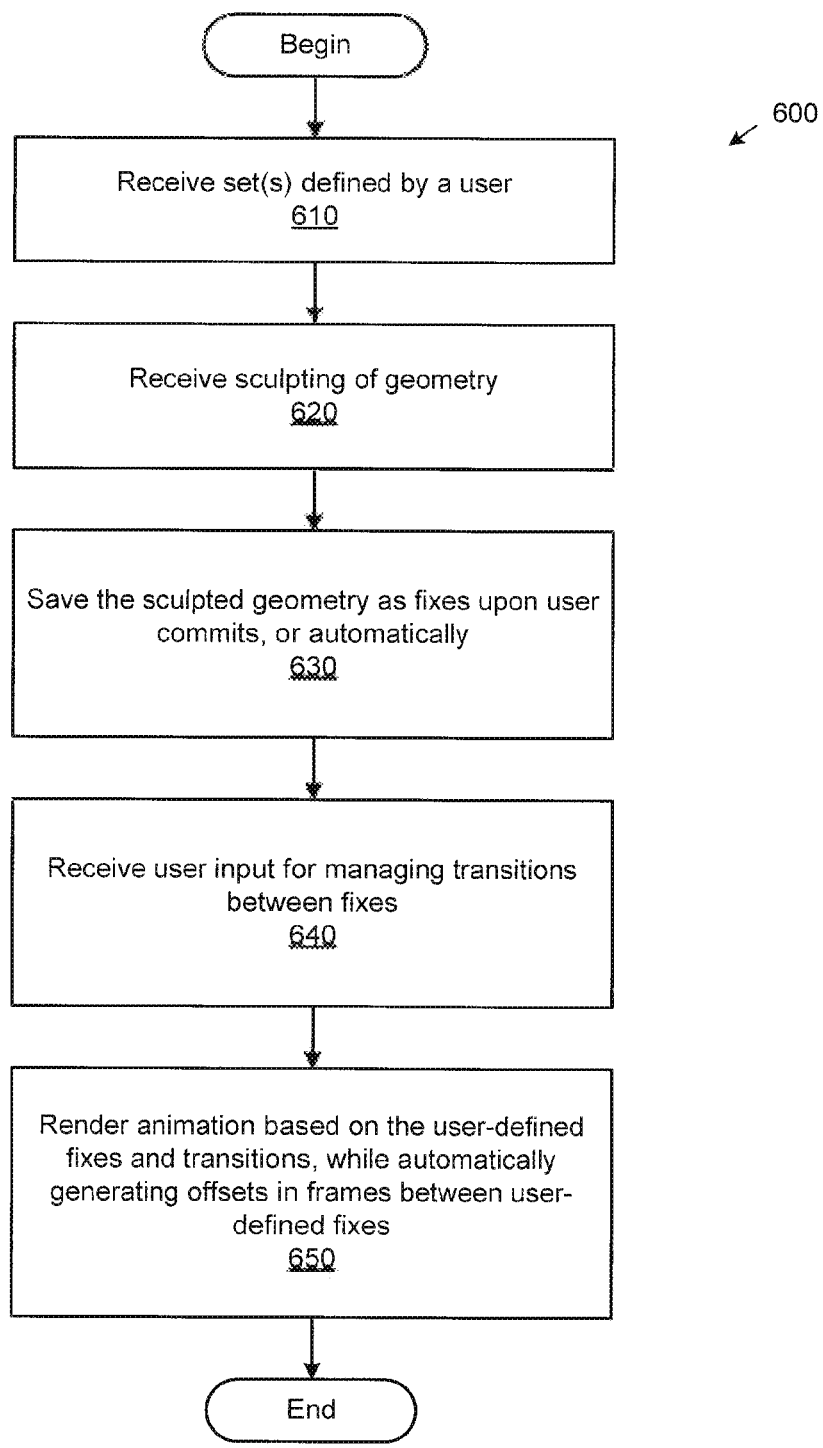
FIG. 6 illustrates a method for progressively sculpting 3D geometry, according to an aspect of this disclosure.

FIG. 6 illustrates a method for progressively sculpting 3D geometry, according to an aspect of this disclosure. At step 610, a sculpting application receives set(s) defined by a user. As discussed, each set includes geometry that is sculpted and managed together, and sets may be associated with certain properties, such as an envelope curve and a coordinate frame to reference offsets. When a user selects and sculpts on geometry belonging to a given set, the resulting sculpt is stored as fixes, including (time, offsets) pairs, and the fixes associated with a set are interpolated with other fixes of the set.

A user may define a set by selecting geometry (which is, of course, a property of the set) to associate with the set and then defining other desired properties of the set, such as an envelope curve, a state (for enabling/disabling the set), and a reference space (also referred to as a "delta space"). Note, the properties may also be modified after fixes are created. For instance, a user may wish to compare reference frames, some of which act faster and some which act slower, to see which reference frame produces the smoothest interpolation, as each reference frame can produce slightly varying interpolations.

At step 620, the sculpting application receives sculpting of geometry. The user may sculpt shapes using various tools, including well known tools for pushing, pulling, smoothing, grabbing, or pinching the original geometry. Although discussed herein primarily with respect to sculpting, it should be understood that fixes can be generated in other ways. For example, a button may be provided that, when pressed, scales input geometry, and the scaled geometry may be stored in a fix.

At step 630, the sculpting application saves the sculpted geometry as one or more fixes in response to a user commit, or automatically. That is, the user may explicitly commit changes, which are then compared with the original geometry to generate offsets for a fix, or a similar process may be performed automatically, such as periodically. As discussed, geometry in each may be sculpted separately. For example, the user may select a set which includes a character's clothing and sculpt that set, then select and sculpt a different set which includes the character's cape.

In one configuration, the sculpting application may provide offset manipulation tools including an offset slider and two offset brushes: reset and zero. As discussed, the offset slider is configured to gradually blend a current sculpt with offsets of the fix that are chronologically next or prior, the reset brush is configured to progressively reduce the magnitude of changes introduced by the sculpting process, and the zero brush is similar to the reset brush, except that it removes interpolated offsets as well. By working with the offset slider, offset brushes, and other digital sculpting tools, the user may modify offsets and/or create new offsets according to desired artistic goals.

As discussed, more than one fix may be associated with each set at different times, with one fix per frame for a given set. Fixes may be stored as (time, offsets) pairs, with each offset associated with a set and defined in regard to a reference frame. Further, sculpting may be additive in the sense that a sculpted offset for one set can be applied on top of sculpted offsets for other sets. For each frame, fixes associated with different sets, or offsets generated by interpolating between fixes of each set, are successively applied to achieve the final deformation to geometry. That is, multiple sets may modify the same parts of the geometry, with the result being the accumulation of those modifications.

At step 640, the sculpting application receives user input for managing transitions between fixes. To manage the transitions, users may interactively move markups in a timeline editor user interface, such as the interface 500 discussed above with respect to FIG. 5. Users may selectively apply typical timeline operations such as copy and paste. For example, using copy and paste, a user may move one of the fixes on the timeline so that the fix is applied to a different state of the original 3D geometry (in another animation frame). Further, users may be permitted to scale fixes and control the timing of when fixes come in and out by modifying the envelope curve associated with each set, as discussed above.

As further discussed, the user may also add new fixes between existing fixes if, e.g., the automatic interpolation between the existing fixes is undesirable. In one configuration, the sculpting application may provide the ability to combine existing offsets to create the new offsets. That is, data can be queried from one or more offsets and borrowed to generate new offsets, rather than requiring the user to re-sculpt geometry from scratch.

At step 650, the sculpting application renders the 3D animation based on the user-defined fixes and transitions, while automatically generating offsets in frames between user-defined fixes. To render the animation, the sculpting application takes geometry as input for each frame, retrieves the offsets defined in a corresponding fix or computes offsets if the frame is between fixes using scatter data interpolation, applies the offsets defined in the fixes or the interpolated offsets to the input geometry to obtain new geometry for the frame, and draws the new geometry in that frame. That is, during the rendering, the input geometry data is deformed by offsets which are defined in fixes or are automatically generated from the fixes through interpolation. The interpolation may be performed at runtime, as many interpolation schemes are fast. For example, the sculpting application may generate offsets on the fly when animation time is updated. In such a case, new offset values may be generated with each time step, but not all offsets would necessarily be generated between user defined fixes. Alternatively, interpolation results may be pre-computed and cached if a slower interpolation algorithm is used to, e.g., achieve greater smoothness. In one configuration, the interpolation between fixes is based on a pose space deformation system, and the sculpting application may apply scatter data interpolation, which permits data points (e.g., offsets) anywhere in time to be interpolated.

Figure 7:
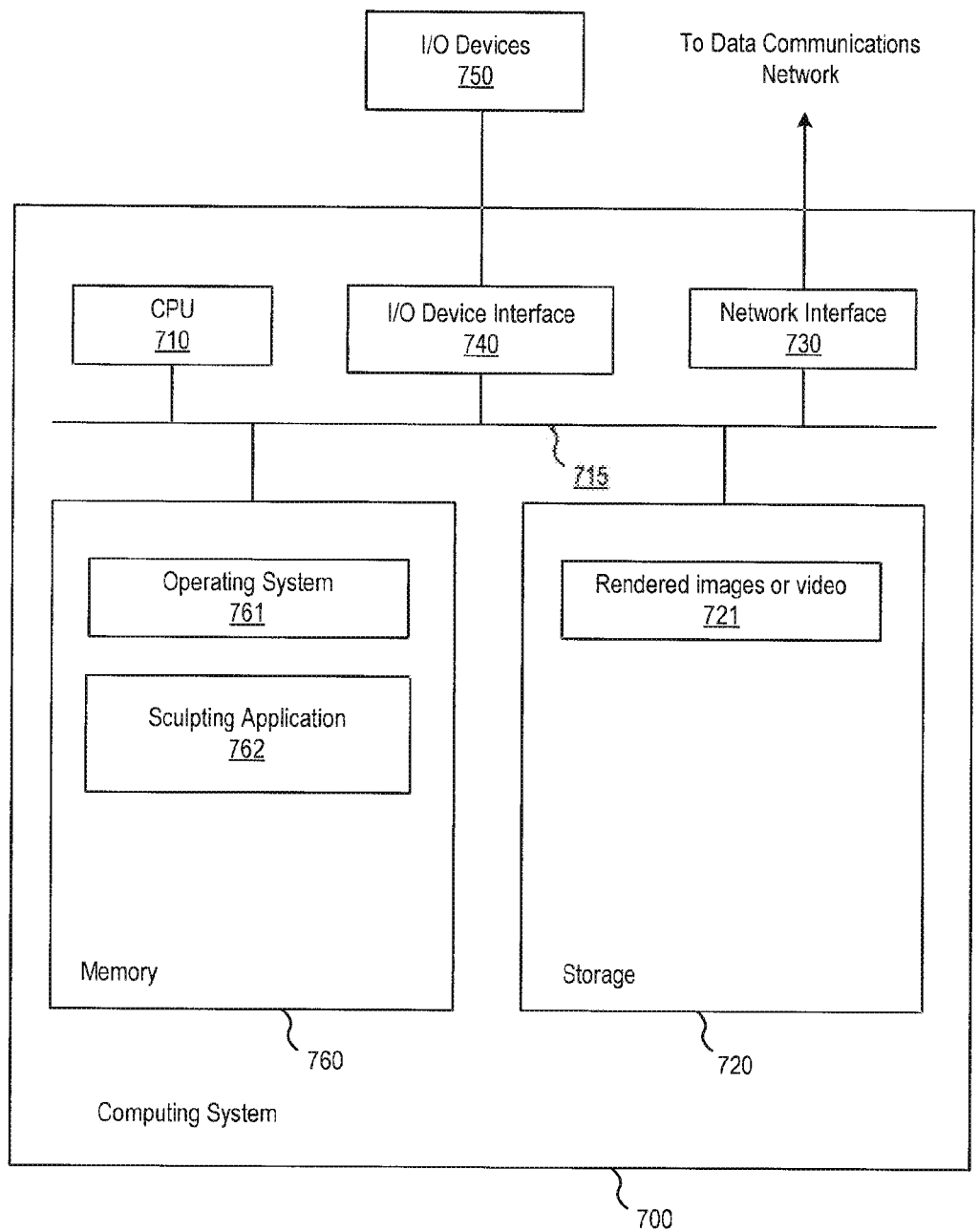
FIG. 7 illustrates a system in which an aspect of this disclosure may be implemented.

FIG. 7 depicts a block diagram of a system 700 in which an aspect of this disclosure may be implemented. As shown, the system 700 includes, without limitation, a central processing unit (CPU) 610, a network interface 730, an interconnect 715, a memory 760 and storage 720. The system 700 may also include an I/O device interface 740 connecting I/O devices 750 (e.g., keyboard, display and mouse devices) to the system 700.

The CPU 710 retrieves and executes programming instructions stored in the memory 760. Similarly, the CPU 710 stores and retrieves application data residing in the memory 760. The interconnect 715 facilitates transmission, such as of programming instructions and application data, between the CPU 710, I/O device interface 740, storage 720, network interface 730, and memory 760. CPU 610 is included to be representative of a single CPU, multiple CPUs, a single CPU having multiple processing cores, and the like. And the memory 760 is generally included to be representative of a random access memory. The storage 720 may be a disk drive storage device. Although shown as a single unit, the storage 720 may be a combination of fixed and/or removable storage devices, such as fixed disc drives, floppy disc drives, tape drives, removable memory cards or optical storage, network attached storage (NAS), or a storage area-network (SAN). Further, system 700 is included to be representative of a physical computing system as well as virtual machine instances hosted on a set of underlying physical computing systems. Further still, although shown as a single computing system, one of ordinary skill in the art will recognized that the components of the system 700 shown in FIG. 7 may be distributed across multiple computing systems connected by a data communications network.

As shown, the memory 760 includes an operating system 761 and a sculpting application 762. Illustratively, the operating system may include Microsoft's Windows®. The sculpting application 762 is driven by an offset-based, pose space deformation system which permits progressive sculpting of 3D geometry. In one aspect, the sculpting application 762 may be configured to receive a set defined by a user, receive sculpting of geometry, save sculpted geometry as fixes, receive user input for managing transitions between fixes, and render an animation based on the fixes while generating offsets in frames between user-defined fixes by interpolation, according to the method 600 discussed above with respect to FIG. 6. In a particular embodiment, sculpting application 762 may be animation software, such as Autodesk Maya®, having plug-ins that receive and store the fixes, as well as generating offsets in frames between user-defined fixes by interpolation.

Advantageously, techniques disclosed herein provide an effective workflow for sculpting and managing time-based shape changes. In particular, techniques disclosed herein make use of pose space deformation, as opposed to the traditional blendshapes, and scatter data interpolation. Further, techniques disclosed herein store sculpts as fixes, which associate time with offsets, and the offsets themselves are first-class objects that are manipulatable. In addition, disclosed herein are tools for manipulating and/or scaling offsets, including an envelope curve, an offset slider, and offset brushes (reset and zero), which may permit users to quickly apply and adjust many offsets over time in an animation.

The preceding description references aspects of the disclosure. However, it should be understood that the disclosure is not limited to specific described aspects. Instead, any combination of the preceding features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the preceding aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A computer-implemented method for progressively sculpting three-dimensional (3D) virtual geometry in a computer-generated animation with a plurality of frames, comprising:
   receiving one or more sets defined by a user, wherein each set specifies portions of the 3D virtual geometry managed together;
   receiving digital sculpting of the 3D virtual geometry;
   storing the sculpted 3D virtual geometry as fixes, wherein each fix includes a respective time and one or more offsets specifying differences between the 3D virtual geometry before and after the sculpting at the respective time, and wherein each fix is associated with one of the sets defined by the user;
   providing a reset brush which reduces a magnitude of offsets to a previous mesh by coming into contact with the 3D virtual geometry;
   providing a zero brush which removes interpolated offsets and reduces the magnitude of offsets back to an original mesh based on the zero brush coming into contact with the 3D virtual geometry;
   providing an offset slider used to blend a current sculpt with offsets that are chronologically next or prior; and
   rendering the animation by a computer processor based on the fixes and interpolations between the fixes.

2. The method of claim 1, wherein the rendering includes a single deformer in a deformation chain of the 3D virtual geometry, wherein the rendering includes:
   generating transition offsets between the fixes by interpolating, for each set, the fixes associated with the set;
   for each frame, summing the transition offsets or offsets in the fixes associated with the frame;
   applying the summed offsets to input 3D virtual geometry to obtain deformed geometry; and
   drawing the deformed geometry.

3. The method of claim 2, wherein the one or more sets include a first set and a second set, wherein a first portion of the 3D virtual geometry is included in the first and second sets, wherein each fix associated with the first and second sets modifies the first portion of the 3D virtual geometry, wherein the deformed geometry of the first portion of the 3D virtual geometry is based on the summed offsets of each fix associated with the first and second sets, wherein the interpolations are scatter-data interpolations.

4. The method of claim 1, wherein the digital sculpting is made on a pose space deformation (PSD) system.

5. The method of claim 1, wherein each of the one or more sets is associated with one or more properties including at least a respective value of an envelope curve.

6. The method of claim 5, further comprising, applying user-specified scaling to one or more of the offsets associated with one of the sets, the scaling being defined via the respective envelope curve value for the one or more of the sets.

7. The method of claim 1, further comprising, splitting at least one of the sets into two or more sets in response to a user request.

8. The method of claim 1, further comprising, merging at least two of the sets into a single set in response to a user request.

9. A non-transitory computer-readable storage medium storing a program, which, when executed by a processor performs operations for progressively sculpting three-dimensional (3D) virtual geometry in an animation with a plurality of frames, the operations comprising:
receiving one or more sets defined by a user, wherein each set specifies portions of the 3D virtual geometry managed together, wherein each set is associated with a respective value of an envelope curve;
receiving digital sculpting of the 3D virtual geometry;
storing the sculpted 3D virtual geometry as fixes, wherein each fix includes a respective time and one or more offsets specifying differences between the 3D virtual geometry before and after the sculpting at the respective time, and wherein each fix is associated with one of the sets defined by the user;
providing a reset brush which reduces a magnitude of offsets to a previous mesh by coming into contact with the 3D virtual geometry;
providing a zero brush which removes interpolated offsets and reduces the magnitude of offsets back to an original mesh based on the zero brush coming into contact with the 3D virtual geometry;
providing an offset slider used to blend a current sculpt with offsets that are chronologically next or prior; and
rendering the animation by a computer processor based on the fixes and interpolations between the fixes.

10. The computer-readable storage medium of claim 9, wherein the rendering includes a single deformer in a deformation chain of the 3D virtual geometry, wherein the rendering includes:
generating transition offsets between the fixes by interpolating, for each set, the fixes associated with the set;
for each frame, summing the transition offsets or offsets in the fixes associated with the frame;
applying the summed offsets to input 3D virtual geometry to obtain deformed geometry; and
drawing the deformed geometry.

11. The computer-readable storage medium of claim 10, wherein the one or more sets include a first set and a second set, wherein a first portion of the 3D virtual geometry is included in the first and second sets, wherein each fix associated with the first and second sets modifies the first portion of the 3D virtual geometry, wherein the deformed geometry of the first portion of the 3D virtual geometry is based on the summed offsets of each fix associated with the first and second sets, wherein the interpolations are scatter-data interpolations.

12. The computer-readable storage medium of claim 9, wherein the digital sculpting is made on a pose space deformation (PSD) system.

13. The computer-readable storage medium of claim 9, wherein each of the one or more sets is associated with one or more properties including at least a respective value of an envelope curve.

14. The computer-readable storage medium of claim 13, the operations further comprising, applying user-specified scaling to one or more of the offsets associated with one of the sets, the scaling being defined via the respective envelope curve value for the one or more of the sets.

15. The computer-readable storage medium of claim 9, the operations further comprising, splitting at least one of the sets into two or more sets in response to a user request.

16. The computer-readable storage medium of claim 9, the operations further comprising, merging at least two of the sets into a single set in response to a user request.

17. A system, comprising:
a processor; and
a memory, wherein the memory includes an application program configured to perform operations for progressively sculpting three-dimensional (3D) virtual geometry in an animation with a plurality of frames, the operations comprising:
receiving one or more sets defined by a user, wherein each set specifies portions of the 3D virtual geometry managed together;
receiving digital sculpting of the 3D virtual geometry;
storing the sculpted 3D virtual geometry as fixes, wherein each fix includes a respective time and one or more offsets specifying differences between the 3D virtual geometry before and after the sculpting at the respective time, and wherein each fix is associated with one of the sets defined by the user;
providing a reset brush which reduces a magnitude of offsets to a previous mesh by coming into contact with the 3D virtual geometry;
providing a zero brush which removes interpolated offsets and reduces the magnitude of offsets back to an original mesh based on the zero brush coming into contact with the 3D virtual geometry;
providing an offset slider used to blend a current sculpt with offsets that are chronologically next or prior; and
rendering the animation by a computer processor based on the fixes and interpolations between the fixes.

18. The system of claim 17, wherein the rendering includes a single deformer in a deformation chain of the 3D virtual geometry, wherein the rendering includes:
generating transition offsets between the fixes by interpolating, for each set, the fixes associated with the set;
for each frame, summing the transition offsets or offsets in the fixes associated with the frame;
applying the summed offsets to input 3D virtual geometry to obtain deformed geometry; and
drawing the deformed geometry,
wherein the one or more sets include a first set and a second set, wherein a first portion of the 3D virtual geometry is included in the first and second sets, wherein each fix associated with the first and second sets modifies the first portion of the 3D virtual geometry, wherein the deformed geometry of the first portion of the 3D virtual geometry is based on the summed offsets of each fix associated with the first and second sets.

* * * * *